UNITED STATES PATENT OFFICE.

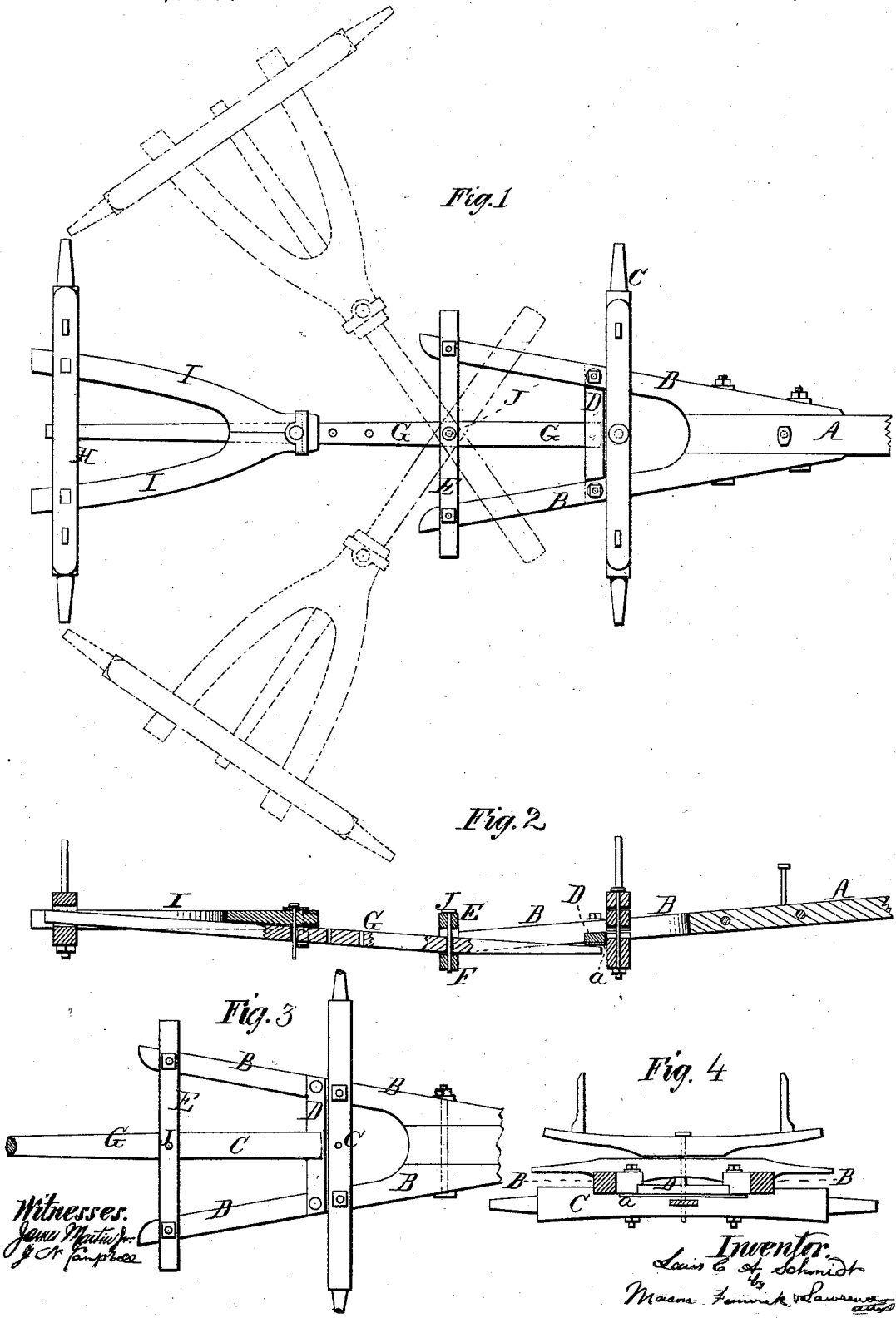

LOUIS C. A. SCHMIDT, OF TIFFIN, OHIO.

IMPROVEMENT IN RUNNING-GEARS.

Specification forming part of Letters Patent No. 168,586, dated October 11, 1875; application filed July 29, 1875.

*To all whom it may concern:*

Be it known that I, LOUIS C. A. SCHMIDT, of Tiffin, county of Seneca and State of Ohio, have invented a new and Improved Wagon Coupling and Hound; and I do hereby declare that the following is a full, clear, and exact description thereof, reference being had to the accompanying drawings making part of this specification, in which—

Figure 1 is a top view of my invention. The normal position of the parts is shown in black lines, and the relative positions of the front and hind wheels when the wagon is in use, and turning to the right or left, are shown by dotted lines. Fig. 2 is a longitudinal central section; Fig. 3, an inverted plan view of a portion of a wagon, showing the invention. Fig. 4 is a transverse section of the same.

My invention relates to wagon couplings and hounds; and the nature of the same consists in a cross slide-bar in rear of the axle, and supported on the front hounds of the tongue, in combination with a reach leading from the hind axle to and under the cross slide-bar, and which is pivoted loosely to rear cross-bars of the front hounds of the tongue. This construction and combination are such that the tongue is held up in proper place, and prevented from passing from side to side and striking the horses when the wagon is drawn with a load over rough or uneven surfaces, either in running a wheel out of a deep rut or hole, or in raising a wheel over a hard stick or stone extending up above the surface of the ground. Another advantage of the construction is that it enables a loaded wagon to be moved with less power than is the case with wagons coupled in the ordinary manner, inasmuch as the draft of the hind wheels is upward to a greater extent than in the old plans, any downward draft upon the tongue tending to lift the hind wheels upward, and when there is no occasion for such draft the front wheels are acted upon by an upward draft of the reach.

A is the tongue; B, the front hounds, rigidly attached to the front axle C. These hounds extend in front and rear of the axle C, and the tongue is fastened to the front end thereof. D is a cross slide-bar just in rear of the front axle, and bolted to the under side of the rear extension of the hounds B. This bar is set in gains of the hounds, so as to lie flush with the bottom of the same. On the bottom of this bar a metal wearing-plate, $a$, is applied. The extremities of the prongs forming the rear extension of the hound B are connected together by top and bottom bars E F of slightly arching form. The bottom bar F has its bend just the reverse of the top bar E. G is the reach, connected as usual to the rear axle H and rear hounds I. In the reach adjusting-holes are provided, so that the front and hind wheels may be placed farther apart or nearer together, as may be necessary. The front end of the reach extends forward from the rear axle, and passes between the arching-bars E F and under the slide cross-bar D, and terminates behind the front axle. It is coupled to the bars E F very loosely by means of a pin, J, which passes down through it and the bars E F, and forms a pivot for the front and rear portions of the wagon to turn upon horizontally. The reach and the front and rear hounds are connected together by their pins and straps in such a manner that the front axle has freedom to turn up a certain distance independently of the hind axle, and vice versa, and this movement is permitted by the enlarged holes of the coupling-pins and the arching form of the cross-bars E and F of the front hounds. The arching form of the cross-bars E and F also permits the reach with the hind axle and wheels of the wagon to move up and and down when the hind wheels enter ruts or pass over stones and sticks. The cross-bar slide D $a$ acts as a stop and wearing surface for the front end of the reach when the wagon is being turned around a corner, or when the hind axle is forced out of a line parallel with the front axle after the manner illustrated by dotted lines in Fig. 1.

It is apparent from the foregoing description and the drawings that the tongue will swing around and yet not react and strike the legs of the horses drawing the wagon, and that any downward draft upon the tongue will cause the front end of the reach to bear up against the cross-bar slide; and that the reach has freedom to descend at its front end when the hind wheels strike a stone or stick, and to vibrate behind the front axle under the cross-bar slide, as occasion requires.

What I claim is—

1. The front hound, constructed with a rear extension, having a cross-bar slide, D, and arching supporting cross-bars E and F in rear of the front axle, substantially as and for the purpose described.

2. The front hounds, constructed with a cross-bar slide, D, and an arching supporting-bar, F, in combination with a reach, passed over the supporting cross-bar F, under the cross-bar slide D, and terminated behind the front axle C, and coupled to the front hound B by a pivot-pin, J, substantially as described.

LOUIS C. A. SCHMIDT.

Witnesses:
HARRISON NOBLE,
N. B. LUTES.